US010856143B2

(12) United States Patent
Cherian et al.

(10) Patent No.: US 10,856,143 B2
(45) Date of Patent: Dec. 1, 2020

(54) METHOD AND APPARATUS FOR IP ADDRESS ASSIGNMENT

(71) Applicant: QUALCOMM Incorporated, San Diego, CA (US)

(72) Inventors: George Cherian, San Diego, CA (US); Santosh Paul Abraham, San Diego, CA (US); Jouni Malinen, Tuusula (FI); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 14/729,313

(22) Filed: Jun. 3, 2015

(65) Prior Publication Data

US 2016/0360472 A1 Dec. 8, 2016
US 2017/0367033 A9 Dec. 21, 2017

Related U.S. Application Data

(62) Division of application No. 13/836,765, filed on Mar. 15, 2013, now Pat. No. 9,894,599.

(Continued)

(51) Int. Cl.
*H04W 12/06* (2009.01)
*H04W 28/02* (2009.01)
(Continued)

(52) U.S. Cl.
CPC ......... *H04W 12/06* (2013.01); *H04L 61/2015* (2013.01); *H04W 12/08* (2013.01);
(Continued)

(58) Field of Classification Search
None
See application file for complete search history.

(56) References Cited

U.S. PATENT DOCUMENTS

| 7,751,398 B1 | 7/2010 | Veprinsky et al. |
| 8,250,189 B1 * | 8/2012 | Breau ................. H04L 61/2015 709/222 |

(Continued)

FOREIGN PATENT DOCUMENTS

| CN | 101036353 A | 9/2007 |
| CN | 101888630 A | 11/2010 |

(Continued)

OTHER PUBLICATIONS

3GPP TS 33.328 V12.0.0 (Sep. 2012), 3rd Generation Partnership Project; Technical Specification Group Services and System Aspects; IP Multimedia Subsystem (IMS) media plane security (Release 12), pp. 1-48.

(Continued)

*Primary Examiner* — Andre Tacdiran
(74) *Attorney, Agent, or Firm* — Muncy, Geissler, Olds & Lowe, P.C./Qualcomm

(57) ABSTRACT

A method includes, prior to authenticating a mobile device, receiving by an access point a first message from the mobile device, determining that the mobile device is to be authenticated prior to responding to the first message, and sending to an authentication server a second message that includes an authentication request and the first message. The method also includes receiving from the authentication server a third message that includes a response to the authentication request and that further includes the first message.

8 Claims, 9 Drawing Sheets

Related U.S. Application Data

(60) Provisional application No. 61/659,389, filed on Jun. 13, 2012.

(51) Int. Cl.
*H04W 76/11* (2018.01)
*H04L 29/12* (2006.01)
*H04W 48/14* (2009.01)
*H04W 76/10* (2018.01)
*H04W 28/18* (2009.01)
*H04W 84/12* (2009.01)
*H04W 74/08* (2009.01)
*H04W 12/08* (2009.01)

(52) U.S. Cl.
CPC ....... *H04W 28/0205* (2013.01); *H04W 48/14* (2013.01); *H04W 76/10* (2018.02); *H04W 76/11* (2018.02); *H04W 28/18* (2013.01); *H04W 74/08* (2013.01); *H04W 84/12* (2013.01)

(56) References Cited

U.S. PATENT DOCUMENTS

| | | | |
|---|---|---|---|
| 8,369,831 B2 | 2/2013 | Bennett et al. | |
| 2002/0199104 A1* | 12/2002 | Kakemizu | H04L 63/08 713/168 |
| 2003/0067923 A1* | 4/2003 | Ju | H04L 29/12066 370/395.3 |
| 2003/0211839 A1* | 11/2003 | Baum | H04L 29/12018 455/403 |
| 2005/0003794 A1 | 1/2005 | Liu | |
| 2005/0089008 A1* | 4/2005 | Choo | H04W 28/18 370/349 |
| 2005/0135373 A1* | 6/2005 | Ramji | H04L 41/5054 370/395.2 |
| 2005/0152398 A1* | 7/2005 | Shin | H04L 47/10 370/469 |
| 2006/0218229 A1 | 9/2006 | Pandey et al. | |
| 2006/0262732 A1* | 11/2006 | Joutsenvirta | H04W 28/18 370/254 |
| 2007/0006289 A1* | 1/2007 | Limont | H04W 8/22 726/6 |
| 2007/0204330 A1 | 8/2007 | Townsley et al. | |
| 2008/0130575 A1 | 6/2008 | Jun et al. | |
| 2008/0130600 A1* | 6/2008 | Jun | H04W 12/06 370/338 |
| 2008/0137630 A1* | 6/2008 | Park | H04L 29/12283 370/338 |
| 2008/0219230 A1* | 9/2008 | Lee | H04L 61/2571 370/338 |
| 2009/0025059 A1* | 1/2009 | Wang | H04L 69/16 726/3 |
| 2009/0193502 A1* | 7/2009 | Asaumi | H04L 9/3273 726/3 |
| 2009/0197597 A1* | 8/2009 | Kotecha | H04W 8/082 455/433 |
| 2009/0201933 A1* | 8/2009 | Chai | H04L 29/12462 370/395.31 |
| 2009/0274077 A1 | 11/2009 | Meylan et al. | |
| 2010/0077447 A1* | 3/2010 | Dholakia | H04L 63/08 726/3 |
| 2010/0142517 A1* | 6/2010 | Montemurro | H04L 63/20 370/352 |
| 2010/0177714 A1* | 7/2010 | Hanaoka | H04L 61/20 370/329 |
| 2010/0177756 A1* | 7/2010 | Choi | H04W 72/042 370/338 |
| 2010/0265922 A1 | 10/2010 | Bracha | |
| 2010/0279698 A1* | 11/2010 | Wong | H04W 88/06 455/450 |
| 2010/0325714 A1* | 12/2010 | Iyer | H04W 12/0602 726/8 |
| 2011/0026441 A1 | 2/2011 | Diener et al. | |
| 2011/0099595 A1 | 4/2011 | Lindquist et al. | |
| 2011/0199898 A1 | 8/2011 | Cho et al. | |
| 2012/0110334 A1* | 5/2012 | Rossi | H04L 29/12066 713/176 |
| 2012/0254379 A1* | 10/2012 | Barkay | H04L 61/2015 709/221 |
| 2013/0010731 A1 | 1/2013 | Diener et al. | |
| 2013/0024915 A1* | 1/2013 | Jones | H04W 12/06 726/5 |
| 2013/0097674 A1* | 4/2013 | Jindal | H04L 63/0876 726/4 |
| 2013/0117820 A1* | 5/2013 | Cherian | H04L 63/06 726/4 |
| 2013/0145420 A1* | 6/2013 | Ting | H04L 63/08 726/1 |
| 2013/0247150 A1* | 9/2013 | Cherian | H04L 63/0815 726/4 |
| 2013/0250803 A1* | 9/2013 | Abraham | H04L 67/16 370/254 |
| 2013/0263223 A1* | 10/2013 | Cherian | H04L 9/0869 726/4 |
| 2013/0298197 A1* | 11/2013 | Baliga | G06F 21/34 726/4 |
| 2013/0336240 A1 | 12/2013 | Cherian et al. | |
| 2014/0237572 A1* | 8/2014 | Zheng | H04L 61/2015 726/7 |
| 2014/0341185 A1* | 11/2014 | Yoon | H04W 12/06 370/331 |
| 2014/0359740 A1* | 12/2014 | Yoon | H04L 63/0876 726/7 |
| 2015/0237003 A1* | 8/2015 | Ghai | H04L 61/2015 709/220 |
| 2016/0080989 A1* | 3/2016 | McCann | H04W 12/04031 370/331 |

FOREIGN PATENT DOCUMENTS

| | | |
|---|---|---|
| CN | 101998662 A | 3/2011 |
| EP | 1879345 A1 | 1/2008 |
| JP | 2009231973 A | 10/2009 |
| WO | 2007103055 A2 | 9/2007 |
| WO | 2011121295 A1 | 10/2011 |

OTHER PUBLICATIONS

Carvalho, et al., "Delay Analysis of IEEE 802.11 in Single-Hop Networks," Proceedings of the 11th IEEE International Conference on Network Protocols (ICNP'03), 2003, pp. 146-155.

International Search Report and Written Opinion—PCT/US2013/040638—ISA/EPO—dated Nov. 4, 2013.

Jardosh A.P., et al., "IQU: Practical 7-9, Queue-Based User Association Management 17-22 for WLANs," International Conference on Mobile Computing and Networking, Retrieved on Sep. 23, 2006 (Sep. 23, 2006), Sep. 26, 2006 (Sep. 26, 2006), pp. 1-12, XP002708009.

Partial International Search Report—PCT/US2013/040638—ISA/EPO—dated Aug. 13, 2013.

Starzetz P., et al., "Hashing Back off: A Collision-Free Wireless Access Method", May 11, 2009 (May 11, 2009), Networking 2009, Springer Berlin Heidelberg, Berlin, Heidelberg, pp. 429-441, XP019116938, ISBN: 978-3-642-01398-0.

Veltri L., et al., "DHCP-Based Authentication for Mobile Users/Terminals in a Wireless Access Network", Jul. 17, 2004 (Jul. 17, 2004), Telecommunications and Networking—ICT 2004; [Lecture Notes in Computer Science; LNCS], Springer-Verlag, Berlin/Heidelberg, pp. 1274-1281, XP019009256, ISBN: 978-3-540-22571-3.

European Search Report—EP15187885—Search Authority—The Hague—dated Jan. 4, 2016.

European Search Report—EP15187891—Search Authority—The Hague—dated Jan. 12, 2016.

* cited by examiner

METHOD AND APPARATUS FOR IP ADDRESS ASSIGNMENT

I. CROSS-REFERENCE TO RELATED APPLICATIONS

The present application is a divisional application of and claims priority to commonly owned U.S. patent application Ser. No. 13/836,765 filed Mar. 15, 2013, which claims priority from commonly owned U.S. Provisional Patent Application No. 61/659,389 filed Jun. 13, 2012, the contents of both of which are expressly incorporated herein by reference in their entirety.

II. FIELD

The present disclosure is generally related to link setup in wireless networks.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks.

Such wireless devices may use wireless connections to access a network in order to transmit and receive data. For example, mobile devices may use wireless fidelity (Wi-Fi) connections to access the Internet using network devices, such as an access point. However, establishing a data connection between a mobile device and the Internet can be time consuming due to various communications that are exchanged between the mobile device and the access point before user data is transferred. Further, in some cases, multiple mobile devices may attempt to establish connections simultaneously, overwhelming the access point with requests, which may cause the access point to perform slowly or to fail. Accordingly, network access (and data transfer) may be delayed.

IV. SUMMARY

Techniques are disclosed that enable fast initial setup of wireless connections, such as initial setup of a wireless fidelity (Wi-Fi) connection to a wireless local area network (WLAN). The techniques may decrease the delay users experience when waiting for initial access to a network (e.g., the delay when waiting to establish a data connection between a mobile device and an access point). The techniques may be particularly advantageous when numerous users attempt to connect to an access point at one time (e.g., when numerous passengers depart from a train that has arrived at a station).

In a particular embodiment, a method includes receiving by a mobile device a beacon sent from an access point. The beacon includes a duration parameter associated with a duration of a time interval for device authentication and association. The method further includes performing a hash operation on a value that is selected by the mobile device or that is associated with the mobile device. Performing the hash operation on the value generates a back-off time interval. During the time interval for device authentication, the mobile device sends to the access point at a time determined according to a start time of the time interval plus the back-off time interval an authentication request, an association request, or a combination thereof.

In a particular embodiment, a method includes determining by an access point a load associated with a wireless local area network (WLAN), an expected load associated with the WLAN, or a combination thereof. Based on the load or the expected load, a duration parameter associated with a duration of a time interval for device authentication is determined. The method further includes sending a beacon at a beacon transmit time. The beacon includes the duration parameter. An authentication request is received by the access point from a mobile device during the time interval for device authentication.

In a particular embodiment, a mobile device includes a processor and a memory storing instructions. The instructions are executable by the processor to cause the processor to receive a beacon sent from an access point. The beacon includes a duration parameter associated with a duration of a time interval for device authentication and association. The instructions are further executable by the processor to cause the processor to perform a hash operation on a value that is selected by the mobile device or that is associated with the mobile device. Performing the hash operation on the value generates a back-off time interval. The instructions are further executable by the processor to cause the processor to send to the access point, during the time interval for device authentication, an authentication request at a time determined according to a start time of the time interval plus the back-off time interval.

In a particular embodiment, a network device includes a processor and a memory storing instructions. The instructions are executable by the processor to cause the processor to determine a load associated with a wireless local area network (WLAN), an expected load associated with the WLAN, or a combination thereof. The instructions are further executable by the processor to cause the processor to determine based on the load or the expected load, a duration parameter associated with a duration of a time interval for device authentication. The instructions are further executable by the processor to cause the processor to initiate sending, at a beacon transmit time, a beacon that includes the duration parameter and to receive an authentication request from a mobile device during the time interval for device authentication.

In a particular embodiment, a method includes scanning by a mobile device, for a first wireless communication channel that is reserved for device authentication and association. The method further includes sending an authentication request to an access point via the first wireless communication channel and receiving a reply to the authentication request from the access point.

In a particular embodiment, a method includes receiving by an access point an authentication request from a mobile device. The authentication request is received via a first wireless communication channel. The first wireless communication channel is reserved for device authentication and association. The method further includes communicating with an authentication server to authenticate the mobile device. A reply to the authentication request is sent to the mobile device via the first wireless communication channel.

In a particular embodiment, a mobile device includes a processor and a memory storing instructions. The instructions are executable by the processor to cause the processor to scan for a first wireless communication channel that is reserved for device authentication and association. The instructions are further executable by the processor to send an authentication request to an access point via the first wireless communication channel and to receive a reply to the authentication request from the access point.

In a particular embodiment, a network device includes a processor and a memory storing instructions. The instructions are executable by the processor to cause the processor to receive an authentication request from a mobile device. The authentication request is received via a first wireless communication channel that is reserved for device authentication and association. The instructions are further executable by the processor to communicate with an authentication server to authenticate the mobile device and to send a reply to the authentication request to the mobile device via the first wireless communication channel.

In a particular embodiment, a method includes receiving by an access point a first message from the mobile device prior to authenticating a mobile device. Upon determining that the mobile device is to be authenticated prior to responding to the first message, a second message is sent to an authentication server. The second message includes an authentication request and the first message. The method further includes receiving from the authentication server a third message that includes a response to the authentication request and that further includes the first message.

In a particular embodiment, a method includes receiving a first message from an access point. The message includes an authentication request and further includes a second message sent from a mobile device to the access point. The mobile device is to be authenticated prior to responding to the second message. The method further includes storing at least temporarily the second message while authenticating the mobile device based on the authentication request and sending to the access point a third message that authenticates the mobile device. The third message includes the second message.

In a particular embodiment, a network device includes a processor and a memory storing instructions. The instructions are executable by the processor to cause the processor to receive a first message from a mobile device. The mobile device is to be authenticated prior to responding to the first message. The instructions are further executable by the processor to send to an authentication server a second message that includes an authentication request and the first message and to receive from the authentication server a third message. The third message includes a response to the authentication request and the first message.

In a particular embodiment, a server includes a processor and a memory storing instructions. The instructions are executable by the processor to cause the processor to receive a first message from an access point. The message includes an authentication request and further includes a second message sent from a mobile device to the access point. The mobile device is to be authenticated prior to responding to the second message. The instructions are further executable by the processor to store at least temporarily the second message while authenticating the mobile device based on the authentication request and to send to the access point a third message that authenticates the mobile device. The third message includes the second message.

One particular advantage provided by at least one of the disclosed embodiments is faster device authentication and association. For example, when numerous mobile devices attempt to authenticate and associate with an access point (e.g., when a train carrying numerous passengers arrives at a train station), techniques described herein may reduce time spent by the mobile devices scanning for available channels. Techniques described herein may reduce the likelihood of a large number of mobile devices overwhelming the access point by sending authentication requests at the same time. Still further, techniques described herein may reduce the likelihood of the access point buffering requests from the mobile devices that are not processed. Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
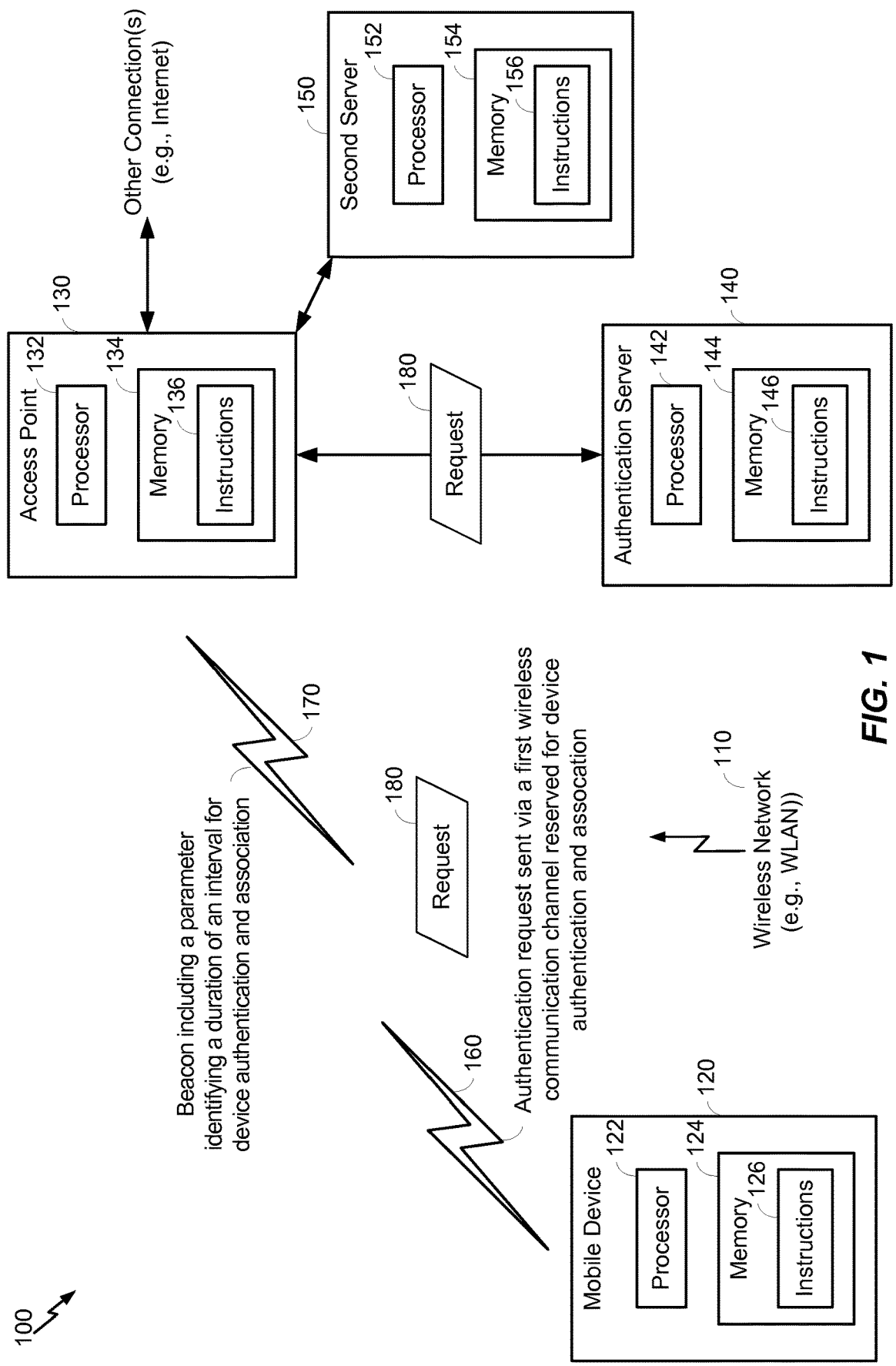
FIG. 1 depicts an illustrative operation of devices within a network, such as a wireless local area network (WLAN), using a first wireless communication channel that is reserved for device authentication and association.

Referring to FIG. 1, a particular illustrative embodiment of devices communicating within a wireless network 110 is depicted and generally designated 100. The devices include a mobile device 120 and one or more network devices. The one or more network devices of FIG. 1 include an access point 130, an authentication server 140, and a second server 150. In at least one embodiment, the authentication server 140 processes authentication requests from the access point 130 and the second server 150 is a server, such as a dynamic host configuration protocol (DHCP) server, that processes association requests, as explained further below. The wireless network 110 may be a wireless local area network (WLAN). The mobile device 120 and the access point 130 may communicate according to one or more Institute of Electrical and Electronics Engineers (IEEE) 802.11 wireless communication protocols, such as a wireless fidelity (Wi-Fi) communication protocol. As depicted in FIG. 1, the access point 130 may be coupled to other devices, such as to other servers via an Internet connection.

The mobile device 120, the access point 130, the authentication server 140, and the second server 150 may each include at least one processor coupled to at least one memory that stores instructions that are executable by the at least one processor to perform one or more of the operations and methods described herein. For example, FIG. 1 depicts that the mobile device 120 includes a processor 122 coupled to a memory 124 that stores instructions 126 that are executable by the processor 122. As another example, FIG. 1 illustrates that the access point 130 includes a processor 132 coupled to a memory 134 that stores instructions 136 that are executable by the processor 132. The authentication server 140 includes a processor 142 coupled to a memory 144 that stores instructions 146 that are executable by the processor 142. In addition, the second server 150 includes a processor 152 coupled to a memory 154 that stores instructions 156 that are executable by the processor 152.

Although FIG. 1 depicts one illustrative mobile device (i.e., the mobile device 120), it should be appreciated that the wireless network 110 can include any number of mobile devices at any given time. In cases where many mobile devices attempt to authenticate and associate with the access point 130 at a particular time, the access point 130 may be overwhelmed with requests, delaying connection of mobile devices to resources accessible via the wireless network 110. Further, the mobile devices may consume power and time searching for an appropriate wireless communication channel with which to communicate with the access point 130, for example by sending multiple probe requests via multiple channels to detect one or more access points using the multiple channels, or by "listening" for beacons (e.g., adjusting a transceiver to receive the beacons) sent by one or more access points via the multiple channels (e.g., by performing an active scan operation or a passive scan operation, respectively).

Accordingly, in a particular embodiment, mobile devices (e.g., the mobile device 120) attempting to authenticate and associate with the access point 130 automatically scan one or more reserved wireless communication channels (e.g., one or more "priority" wireless communication channels) when attempting to associate and authenticate with an access point. For example, a mobile device may automatically adjust a transceiver to one of the reserved wireless communication channels and attempt to communicate with an access point using the reserved wireless communication channel. The mobile devices may use the one or more reserved wireless communication channels to perform authentication and association operations. In at least one embodiment, the one or more reserved wireless communication channels are reserved for link setup, such as for device authentication and association (e.g., the reserved channels are not used for transfers of user data between the mobile device 120 and the access point 130). Wireless communication channels reserved for device authentication and association are described further with respect to at least FIGS. 2-4 and 9.

In at least one embodiment, the access point 130 periodically transmits a message (e.g., a beacon 170) that identifies the wireless network 110 such that mobile devices can detect the wireless network 110 using a "passive scan" operation (e.g., by receiving the beacon 170 using a transceiver or a receiver). For example, the beacon 170 may include information associated with the wireless network 110, such as network bandwidth, a media access control (MAC) address of the access point 130, or a combination thereof. The beacon 170 may be transmitted via the one or more wireless communication channels reserved for link setup. The beacon 170 may include a parameter that identifies a duration of an interval for device authentication and association. Mobile devices may each separately determine a "back-off interval" (e.g., a time offset) from the start of the interval for device authentication and association so that the access point 130 is not overwhelmed with concurrent requests sent from mobile devices in response to the beacon 170. The parameter that identifies the duration of the interval for device authentication and association and the back-off interval are described further with reference to at least FIGS. 5 and 6.

In at least one embodiment, when the access point 130 receives from the mobile device 120 a request 180 that will not be processed until the mobile device 120 is authenticated, the access point appends (e.g., "piggybacks") the request 180 to an authentication communication sent from the access point 130 to the authentication server 140. An example of such a request is an Internet Protocol (IP) address assignment request sent by the mobile device 120 with the authentication request 160. Accordingly, after receiving the request 180 from the mobile device 120, the access point 130 may send to the authentication server 140 a message that includes a request to authenticate the mobile device 120 in addition to the request 180. By sending the request 180 and other messages to the authentication server 140, the access point 130 may avoid creating a new state (e.g., buffering requests for) each mobile device attempting to authenticate with the access point 130. Avoiding the creation of a new state for each of the mobile devices may be advantageous when many mobile devices are concurrently attempting to authenticate with the access point 130. The authentication server 140 may return the request 180 to the access point 130 with results of the authentication process, at which time the access point 130 may process the request 180 (e.g., by communicating with the second server 150 to associate a network address, such as an IP address, with the mobile device 120). Exchanges of requests that are not processed until a mobile device is authenticated are described further with reference to at least FIGS. 7 and 8.

Figure 2:
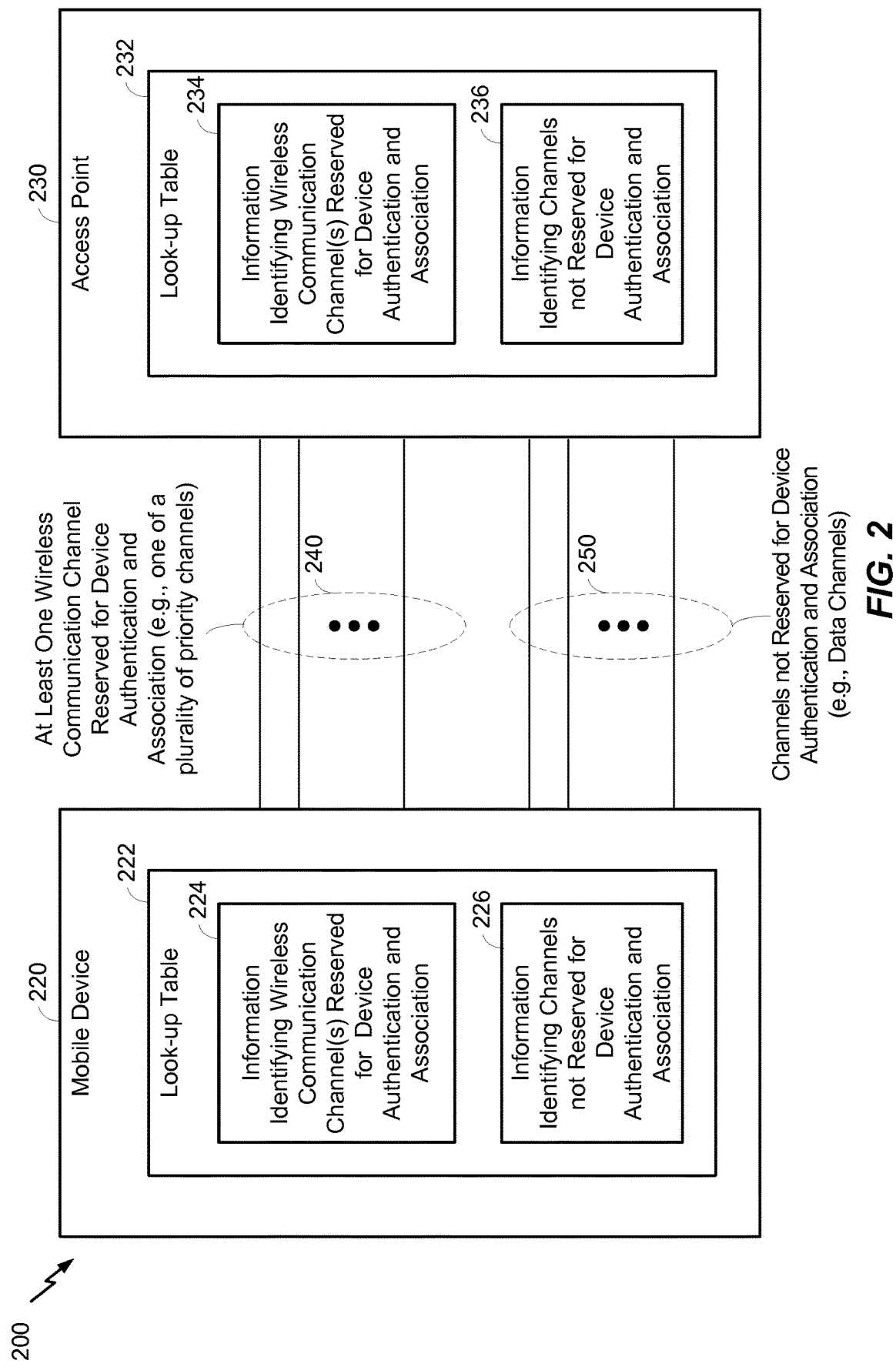
FIG. 2 is a block diagram that illustrates communications between devices, such as two of the devices of the network of FIG. 1.

Referring to FIG. 2, a particular illustrative embodiment of a mobile device 220, an access point 230, and multiple wireless communication channels is depicted and generally designated 200. In at least one embodiment, the mobile device 220 and the access point 230 respectively correspond to the mobile device 120 and the access point 130 described with reference to FIG. 1. The multiple wireless communication channels include at least one wireless communication channel 240 that is reserved for device authentication and association and further include channels 250 not reserved for device authentication and association (e.g., data channels). The at least one wireless communication channel 240 may be reserved for a particular time interval (e.g., for the interval for device authentication and association described with reference to FIG. 1), after which the at least one wireless communication channel 240 may be used for data communications. In at least another embodiment, the at least one wireless communication channel 240 is reserved for device authentication and association at all times or for an extended time period.

In the embodiment shown in FIG. 2, the mobile device 220 stores a look-up table 222 that includes information 224 identifying the at least one wireless communication channel 240. The look-up table 222 may further include information 226 identifying channels not reserved for device authentication and association, such as the channels 250. The access point 230 stores a look-up table 232 that includes information 234 identifying the at least one wireless communication channel 240 and that further includes information 236 identifying channels not reserved for device authentication and association, such as the channels 250. The look-up table 232 may be stored at the memory 134 of FIG. 1 and may be accessible to the processor 132 of FIG. 1.

The mobile device 220 may be provisioned with the information 224, the information 226, or a combination thereof, via a cellular connection or via a previous wireless fidelity (Wi-Fi) connection, such as from a service provider associated with the mobile device 220. The mobile device 220 may store the information 224 and the information 226 in the look-up table 222 and may subsequently scan for the at least one wireless communication channel 240 each time the mobile device 220 enters a wireless fidelity (Wi-Fi) mode of operation (e.g., a mode of operation that utilizes a wireless local area network (WLAN) to communicate data). In at least one embodiment, when the mobile device 220 is in the Wi-Fi mode of operation, the mobile device 220 utilizes a "passive scan" operation to scan for beacons sent from an access point, such as the access point 230. Upon detecting such a beacon, the mobile device 220 may initiate the authentication and association operations described with reference to FIG. 1. As will be appreciated, the at least one wireless communication channel 240 can be changed, for example by the service provider, by reconfiguring the mobile device 220 with information that replaces the information 224 (e.g., if the at least one wireless communication channel 240 is reallocated to be reserved for a different purpose than device authentication and association).

The access point 230 may be provisioned with the information 234, the information 236, or a combination thereof, via an Internet connection or other network connection, for example from the service provider associated with the mobile device 220. The access point 230 may store the information 234 and the information 236 in the look-up table 232 and may subsequently use the at least one wireless communication channel 240 for device authentication and association. As will be appreciated, the at least one wireless communication channel 240 can be changed, for example by the service provider, by configuring the access point 230 with corresponding information to replace the information 234.

By accessing the information 224 to scan for the at least one wireless communication channel 240 upon entering a wireless fidelity (Wi-Fi) mode of operation, the mobile device 220 may authenticate and associate with the access point 230 more quickly, since for example the mobile device may avoid the process of scanning all available channels. The mobile device 220 may therefore establish data connections (e.g., via the channels 250) more quickly.

In at least one embodiment, the at least one wireless communication channel 240 comprises multiple channels ordered according to a "priority" list (e.g., a list of channels the mobile device 220 scans prior to other channels, such as the channels 250). The priority list may be stored at the look-up table 222 and may be included in the information 224. The at least one wireless communication channel 240 may comprise a plurality of subcarrier channels. Further, the at least one wireless communication channel 240 may be reserved for a particular time interval (e.g., for the interval for device authentication and association described with reference to FIG. 1), after which the at least one wireless communication channel 240 may be used for data communications. In at least another embodiment, the at least one wireless communication channel 240 is reserved for device authentication and association at all times. In at least one embodiment, particular channels can be dynamically reassigned from being reserved to non-reserved, and vice versa. For example, based on a network load, if more channels for device authentication and association are desired, one of the channels 250 can be reserved for device authentication and association, such as by reassigning one of the channels 250 to be included in the at least one wireless communication channel 240.

Figure 3:
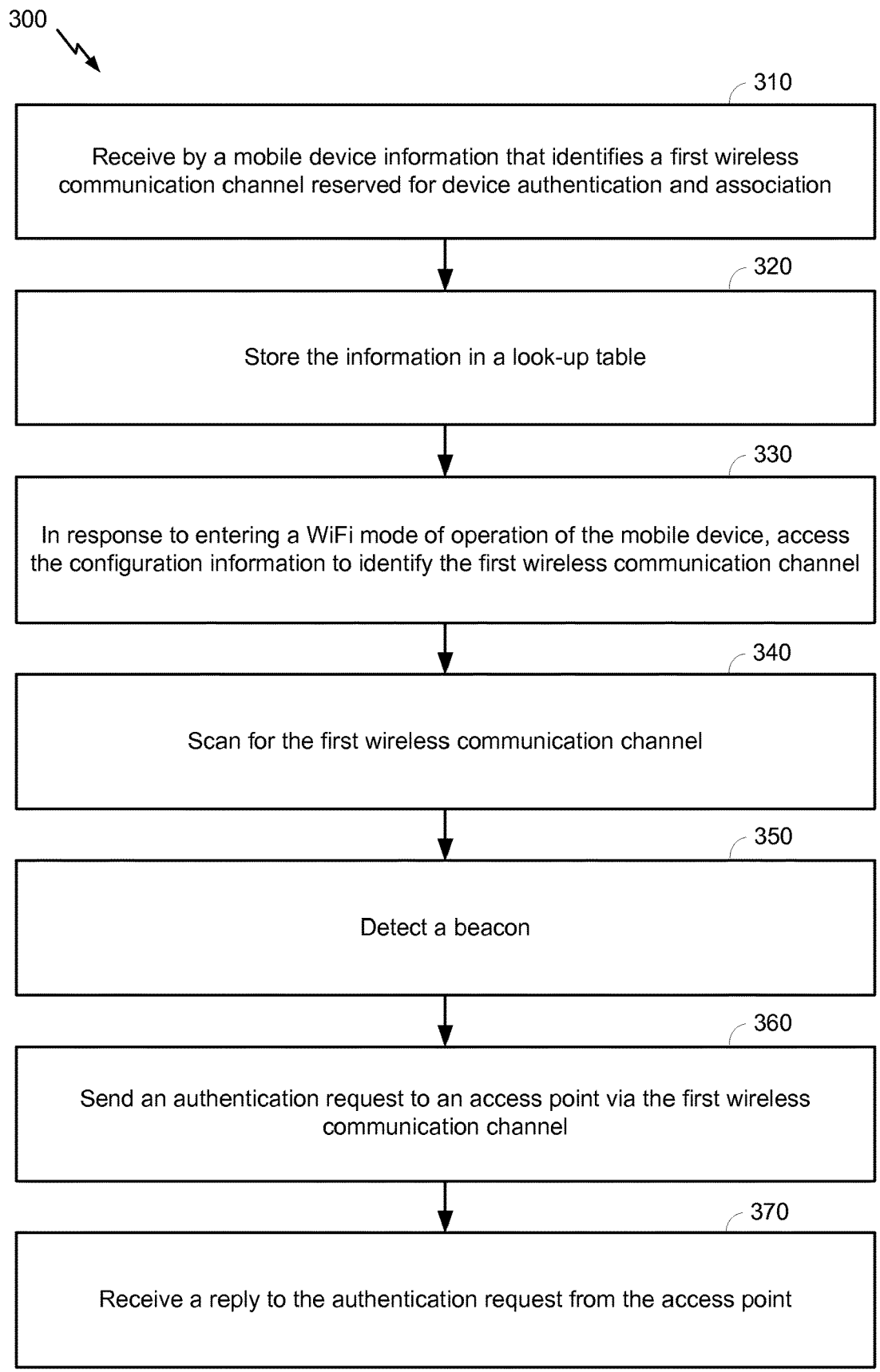
FIG. 3 is a flow chart that illustrates an example method of operation of a device, such as one of the devices of FIG. 1.

FIG. 3 is a flow chart of a method 300 illustrating an example operation of a mobile device, such as the mobile device 120 of FIG. 1, the mobile device 220 of FIG. 2, or a combination thereof. The method 300 includes receiving by the mobile device, at 310, information (e.g., the information 224 of FIG. 2) that identifies a first wireless communication channel that is reserved for device authentication and association, such as the first wireless communication channel described with reference to FIG. 1, the at least one wireless communication channel 240 of FIG. 2, or a combination thereof. In at least one embodiment, the information is provisioned (e.g., via a firmware update) by a service provider associated with the mobile device. In at least another embodiment, the information is stored in the mobile device during a manufacturing stage of the mobile device (e.g., during a firmware loading stage) or in a subscriber identity module (SIM) of the mobile device.

The mobile device may store the information in a look-up table, at 320. The look-up table may be the look-up table 222 of FIG. 2. At 330, the mobile device accesses the information (e.g., performs a look-up operation using the look-up table) to identify the first wireless communication channel. The mobile device may access the information in response to entering a wireless fidelity (Wi-Fi) mode of operation. After identifying the first wireless communication channel, the mobile device may scan for the first wireless communication channel, at 340.

In at least one embodiment, the mobile device passively scans the first wireless communication channel by listening for a beacon (e.g., the beacon 170 of FIG. 1) sent by an access point, such as the access point 130 of FIG. 1, the access point 230 of FIG. 2, or a combination thereof. The access point may send the beacon frequently via the first channel to enable the mobile device to perform faster passive scanning. In other embodiments, the mobile device may actively scan the first wireless communication channel by sending probe requests and awaiting responses to the probe requests from one or more access points within range of the mobile device. Further, the first wireless communication channel may be one of a plurality of priority channels that the mobile device scans in response to entering the Wi-Fi mode of operation (e.g., a plurality of priority channels that are reserved for device authentication and/or association). The first wireless communication channel may be reserved for device authentication and/or association (i.e., may be unavailable for data communications during a time interval reserved for device authentication and association).

According to at least one embodiment where the mobile device uses passive scanning (as illustrated in FIG. 3), the mobile device detects a beacon, at 350. According to at least another embodiment where active scanning is used, the mobile device may send a probe request to the access point and may receive a response to the probe request from the access point. In either case, after detecting the beacon or the probe response, the mobile device may initiate an authentication operation by sending an authentication request to the access point via the first wireless communication channel, at 360. The mobile device may further receive a reply to the authentication request from the access point, at 370. The reply may be sent via the first wireless communication channel. If the authentication process is successful, the mobile device may initiate an association process (e.g., by sending an IP address assignment request to the access point). The method 300 may further include performing a channel reselection operation from the first wireless communication channel to a second wireless communication channel for a data transmission, as described further with reference to FIG. 4. Example association processes are described further with reference to at least FIGS. 7-9.

The method 300 of FIG. 3 may enable fast device authentication and association. For example, when numerous mobile devices attempt to authenticate with an access point (e.g., when a train carrying numerous passengers arrives at a train station), use of a reserved wireless communication channel may reduce time spent by the mobile devices scanning for available channels. Accordingly, the method 300 may reduce delays associated with multiple devices scanning for and trying to establish a channel for authentication with the access point.

To further illustrate, when a large number of devices attempt to discover and associate with the access point, network congestion (e.g., a "signaling storm") may occur, which affects ongoing data transmissions within the network. By sending authentication and/or association communications (e.g., active probe, authentication, and/or association signaling) via the first wireless channel, the ongoing data transmissions on other channels are not impacted by the authentication and/or association communications sent via the first wireless channel. In a particular embodiment, if devices send probe requests via a channel other than the first wireless channel, then the access point may not respond to such probe requests. The access point may also restrict (e.g., omit) one or more fields in beacons sent via the channels other than the first wireless communication channel. For example, the access point may not include a network service set identification (SSID) in beacons sent via channels other than the first wireless channel.

Figure 4:
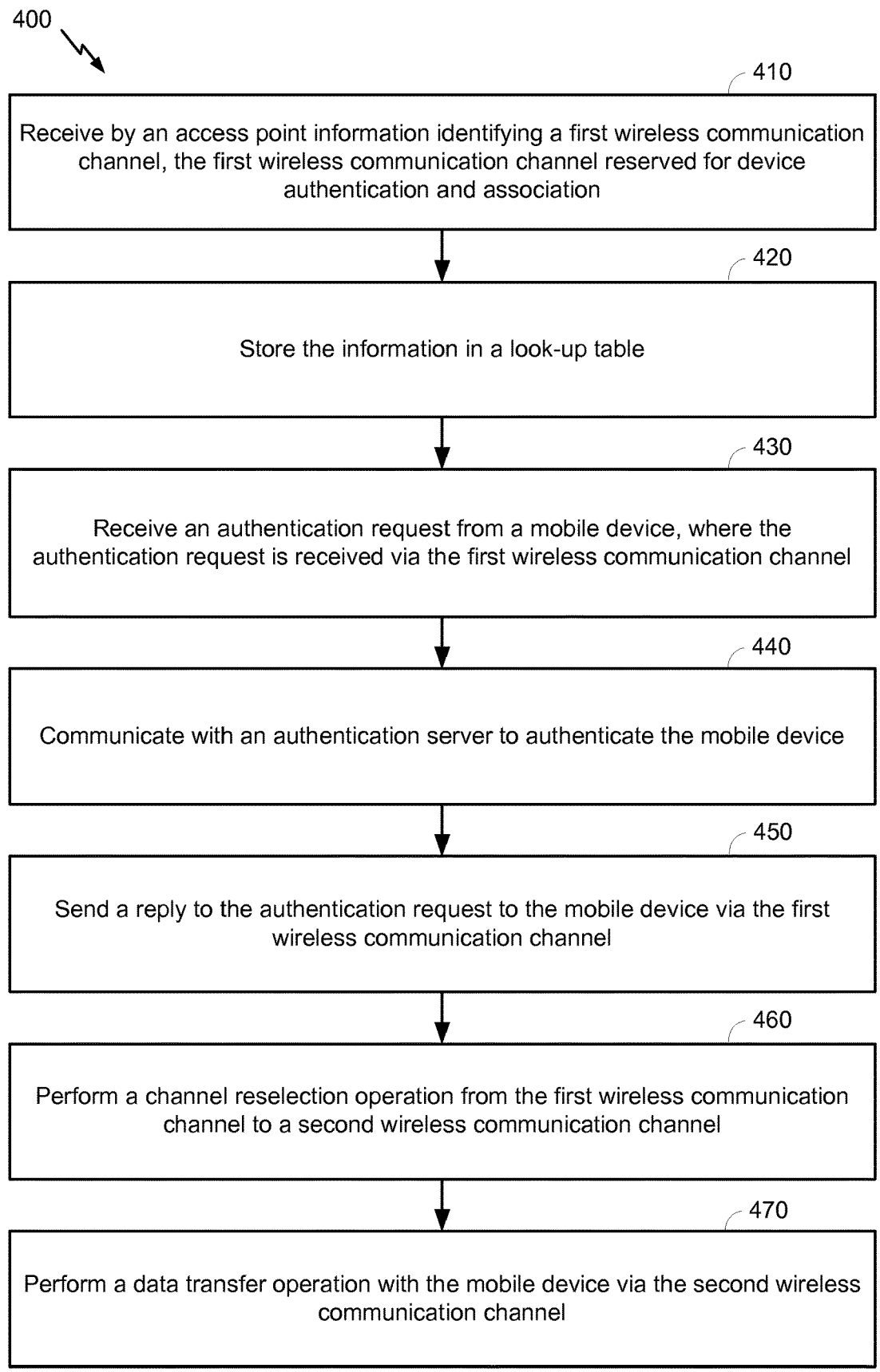
FIG. 4 is a flow chart that illustrates an example method of operation of a device, such as one of the devices of FIG. 1.

FIG. 4 is a flow chart of a method 400 illustrating an example operation of a network device, such as the access point 130 of FIG. 1, the access point 230 of FIG. 2, or a combination thereof. At 410, the access point receives information (e.g., the information 234 of FIG. 2) that identifies a first wireless communication channel reserved for device authentication and association, such as the first wireless communication channel described with reference to FIG. 1, the at least one wireless communication channel 240 of FIG. 2, or a combination thereof. In at least one embodiment, the information is provisioned at the access point by a service operator associated with the access point.

At 420, after receiving the information, the access point stores the information in a look-up table, which may be the look-up table 232 of FIG. 2. When a mobile device initiates an authentication procedure, the access point receives an authentication request from the mobile device, at 430, which may be the mobile device 120 of FIG. 1, the mobile device 220 of FIG. 2, or a combination thereof. The authentication request is received via the first wireless communication channel. The access point may receive additional authentication requests from respective additional mobile devices (e.g., via the first wireless communication channel). At 440, the access point communicates with an authentication server (e.g., the authentication server 140 of FIG. 1) to authenticate the mobile device. In at least one embodiment, communicating with the authentication server includes sending an association request to the authentication server and receiving a response from the authentication server. For example, the access point may send the request 180 of FIG. 1 to the authentication server and may receive back the request 180 of FIG. 1 with results of the authentication process so that the access point can process the request 180 once the mobile device has been authenticated. Example association procedures are described further with reference to at least FIGS. 7 and 8.

At 450, the access point sends a reply to the authentication request to the mobile device (e.g., a message that authenticates the mobile device). In at least one embodiment, after authenticating the mobile device, the access point associates with the mobile device (e.g., using the second server 150 of FIG. 1). Association requests and replies may be exchanged by the mobile device and the access point using the first wireless communication channel reserved for device authentication and association.

According to a first embodiment, the access point performs a channel reselection operation from the first wireless communication channel to a second wireless communication channel (e.g., a channel handoff from the first wireless communication channel to the second wireless communication channel), at 460, after association and authentication are completed via the first wireless communication channel. For example, the mobile device may transition from utilizing the first wireless communication channel to utilizing the second wireless communication channel (e.g., for a data transmission). The second wireless communication channel may be one of the channels 250 not reserved for device authentication and association of FIG. 2 (e.g., a channel for transmitting user data). Upon completing the channel reselection operation, the access point and the mobile device may perform a data transfer operation via the second wireless communication channel, at 470 (e.g., accessing the Internet). Upon completing device authentication and association, the mobile device and the access point may send and receive user data (e.g., while the mobile device is accessing the Internet via the second wireless communication channel and via the access point).

According to another embodiment, the first wireless communication channel is reserved during a particular time interval, such as a time interval that is reserved for device authentication and association. Accordingly, after the time interval for completing device authentication and association, the mobile device and the access point may communicate data without performing a channel reselection operation. The time interval for completing device authentication and association is described further with reference to at least FIGS. 5 and 6. In a particular embodiment, although data transmissions from previously associated devices are allowed during the reserved time interval, authentication and association are not allowed at times outside of the reserved time interval.

The method 400 of FIG. 4 may enable efficient network setup. For example, because the mobile device sends the authentication request to the access point via a predetermined channel known to both the mobile device and the access point (e.g., via the first wireless communication channel identified by the information stored at the look-up table, which may be one of a plurality of priority channels that are scanned in response to entering the Wi-Fi mode of operation, as described with reference to FIG. 3), time spent establishing the first wireless communication channel (e.g., scanning) may be reduced. Further, after authentication, traffic is transferred from the first wireless communication channel (by channel reselection) to the second wireless communication channel, so that the first wireless communication channel is not loaded with a large amount of data traffic.

Figure 5:
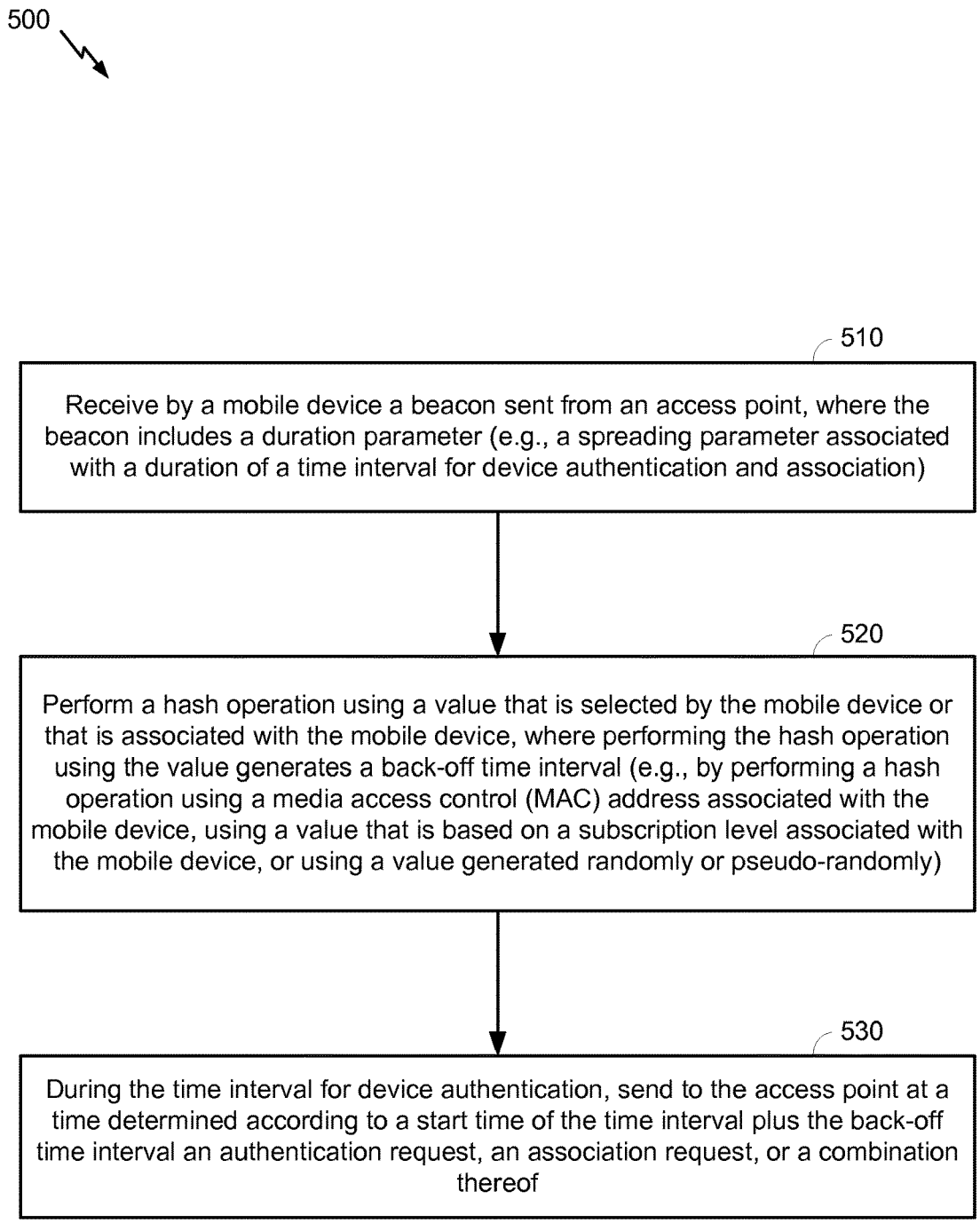
FIG. 5 is a flow chart that illustrates an example method of operation of a device, such as one of the devices of FIG. 1.

FIG. 5 is a flow chart of a method 500 illustrating an example operation of a mobile device, such as the mobile device 120 of FIG. 1, the mobile device 220 of FIG. 2, or a combination thereof. At 510, a beacon sent from an access point is received at a mobile device. The access point may correspond to the access point 130 of FIG. 1, the access point 230 of FIG. 2, or a combination thereof. The beacon includes a duration parameter (e.g., a "spreading" parameter, which may be expressed in milliseconds). The duration parameter may indicate a duration of a time interval for device authentication and association. The mobile device may use the spreading parameter to determine a back-off time interval (e.g., a delay) and may delay initiation of an authentication and/or association process according to the back-off time interval. For example, the mobile device may randomly or pseudo-randomly select a particular value between zero and a value of the spreading parameter. The mobile device may initiate the authentication and/or association process at a time determined by the particular value.

Alternatively or in addition, the mobile device may determine the particular value by performing a hash operation to generate the back-off time interval. For example, at 520, a hash operation is performed using a value that is selected by the mobile device or that is associated with the mobile device. Performing the hash operation generates the back-off time interval. The back-off time interval determines when the mobile device initiates the authentication and/or association process, as described further below. The value may be selected or determined according to one or more techniques, such as according to the spreading parameter, according to a media access control (MAC) address, according to a priority level, randomly or pseudo-randomly, according to a network load, using a hash operation, or a combination thereof.

According to a first technique, the value is associated with the mobile device. For example, the value may be a media access control (MAC) address associated with the mobile device. The MAC address may be assigned by a manufacturer of the mobile device and stored at the mobile device. Because each mobile device attempting to authenticate may be associated with a unique MAC address, each device may generate a unique back-off time interval utilizing the first technique, which reduces the likelihood of multiple mobile devices simultaneously attempting to authenticate with the access point.

According to a second technique, the value corresponds to a priority level associated with the mobile device. For example, the value may be a predetermined value that corresponds to a subscription level (e.g., one of platinum, gold, and silver) associated with the mobile device. By utilizing the second technique, authorization requests from mobile devices of prioritized subscribers (e.g., subscribers of a premium service, subscribers of unlimited data plans, or a combination thereof) are handled before authorization requests from mobile devices of lower priority subscribers (e.g., subscribers of base-level service, subscribers of limited data plans, or a combination thereof). For example, in a particular embodiment, mobile devices associated with a platinum subscription level are assigned a short back-off time interval or no back-off time interval, mobile devices associated with a gold subscription level are assigned an intermediate back-off time interval (e.g., authenticated after the mobile devices associated with the platinum subscription level), and mobile devices associated with a silver subscription level are assigned a long back-off time interval (e.g., authenticated after the mobile devices associated with the gold subscription level).

According to a third technique, the mobile device selects the value randomly or pseudo-randomly. For example, a predetermined random or pseudo-random number generation operation may generate the value upon which the hash operation is performed. Selecting the value randomly or pseudo-randomly may reduce the likelihood of multiple mobile devices attempting to authenticate with the access point simultaneously. Alternatively or in addition, the value may be selected based on a load of a network associated with the access point.

At 530, during the time interval for device authentication, the mobile device sends to the access point, at a time determined according to a start time of the time interval plus the back-off time interval, an authentication request, an association request, or a combination thereof. The authentication request may be the authentication request 160 of FIG. 1. The association request may be the request 180 of FIG. 1. In a particular embodiment, the association request is an Internet Protocol (IP) address assignment request. In at least one embodiment, the time interval begins at a beacon transmit time (i.e., the time at which the access point transmits the beacon) and ends after the duration associated with the duration parameter included in the beacon. Accordingly, in one embodiment, instead of sending an authentication request immediately upon receiving the beacon, each mobile device delays sending the authentication request based on the back-off time interval.

The techniques described with reference to FIG. 5 reduce the likelihood of numerous mobile devices concurrently attempting to authenticate with the access point. In a particular embodiment, the method 500 is performed when a large number of mobile devices attempt to communicate with an access point, such as when a train arrives at a station and a large number of mobile devices attempt to associate with a wireless network at the station. The method 500 may prevent association requests sent from different mobile devices from being synchronized to a network beacon (e.g., multiple mobile devices concurrently sending association requests in response to the network beacon), which could cause congestion, potentially resulting in packet collision and packet loss.

It should be appreciated that mobile devices in a wireless network may each utilize one or more of the techniques described with reference to FIG. 5. Each of the mobile devices in the wireless network may use the same technique, or each of the mobile devices in the wireless network may use different techniques to determine back-off time intervals, so long as the techniques reduce the likelihood of numerous mobile devices concurrently attempting to authenticate with the access point. Further, each of the mobile devices may change (e.g., update) the technique used, for example by receiving configuration data or firmware upgrades from a service provider of the mobile device.

Figure 6:
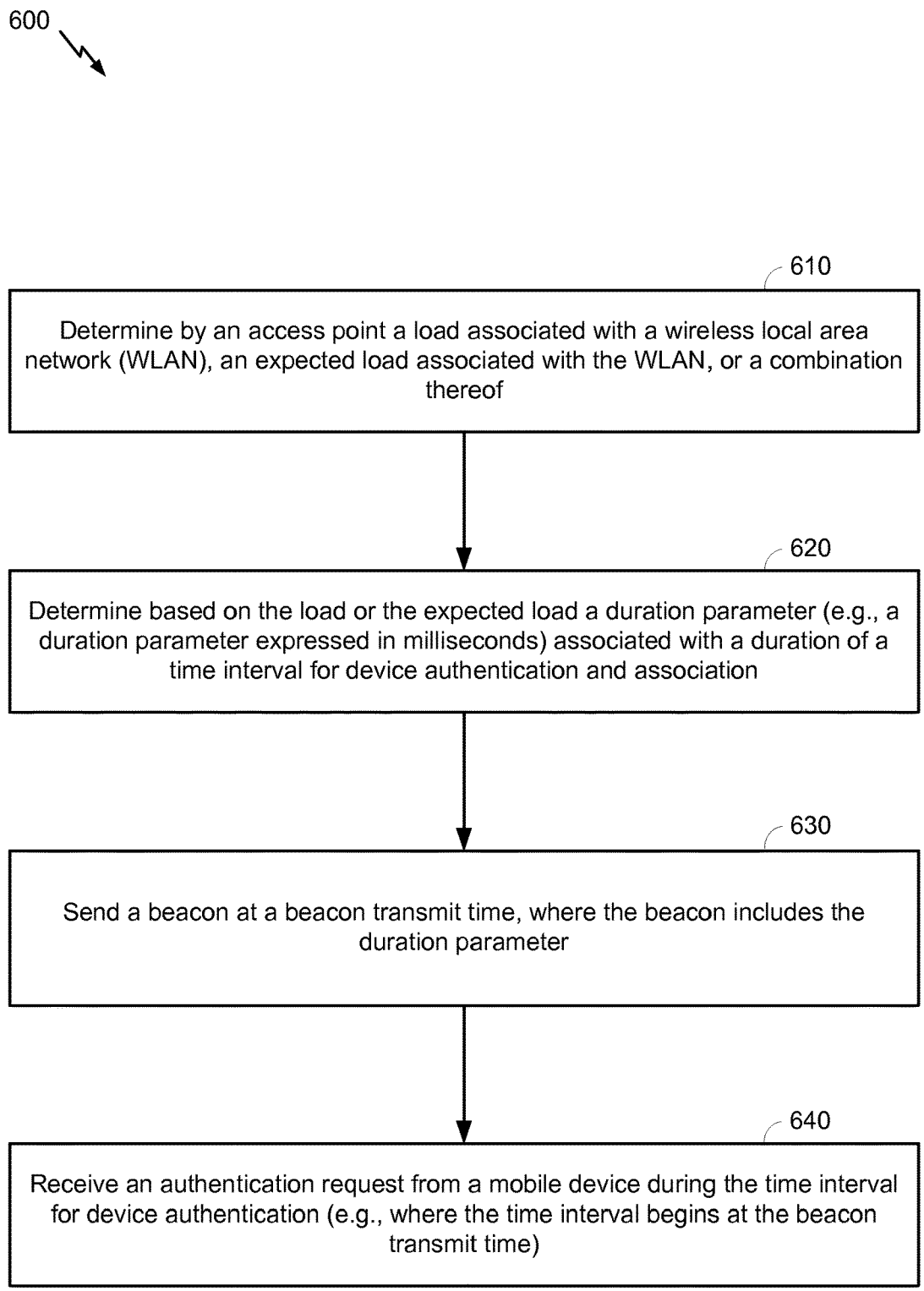
FIG. 6 is a flow chart that illustrates an example method of operation of a device, such as one of the devices of FIG. 1.

FIG. 6 is a flow chart of a method 600 illustrating an example operation of a network device, such as the access point 130 of FIG. 1, the access point 230 of FIG. 2, or a combination thereof. The method 600 includes determining by the access point, at 610, a load associated with a wireless local area network (WLAN), an expected load associated with the WLAN, or a combination thereof. For example, the access point may assess a level of traffic of the WLAN or may perform a computation to determine an expected level of traffic of the WLAN. In at least one embodiment, the WLAN corresponds to the wireless network 110 described with reference to FIG. 1.

At 620, the access point determines, based on the load or the expected load, a duration parameter (e.g., the spreading parameter described with reference to FIG. 5) associated with a duration of a time interval for device authentication and association. The duration parameter may be expressed in milliseconds. At 630, the access point sends a beacon (e.g., the beacon 170 of FIG. 1) at a beacon transmit time. The beacon includes the duration parameter. At 640, an authentication request is received from a mobile device during the time interval for device authentication. The mobile device may be the mobile device 120 of FIG. 1, the mobile device 220 of FIG. 2, other mobile devices not shown, or a combination thereof. In at least one embodiment, the time interval for device authentication and association begins at the beacon transmit time (i.e., at the time when the beacon is transmitted) and ends after the number of milliseconds indicated by the duration parameter.

In a particular embodiment, the value of the spreading parameter is adjusted by the access point based on a load of the WLAN. For example, when the WLAN is loaded heavily, the access point may advertise a large spreading parameter value in the beacon. When the WLAN is loaded lightly, the access point may advertise a small spreading parameter value in the beacon.

By determining the duration parameter based on the load and/or the expected load as described with reference to FIG. 6, the duration of the time interval for device authentication and association may be selected based on conditions of the WLAN (e.g., traffic of the WLAN, a number of devices in the WLAN, or a combination thereof). For example, the duration may be shorter when fewer mobile devices are attempting to authenticate with the access point and may be longer when more mobile devices are attempting to authenticate with the access point. Network resources may thus be allocated dynamically based on network load or expected network load.

Figure 7:
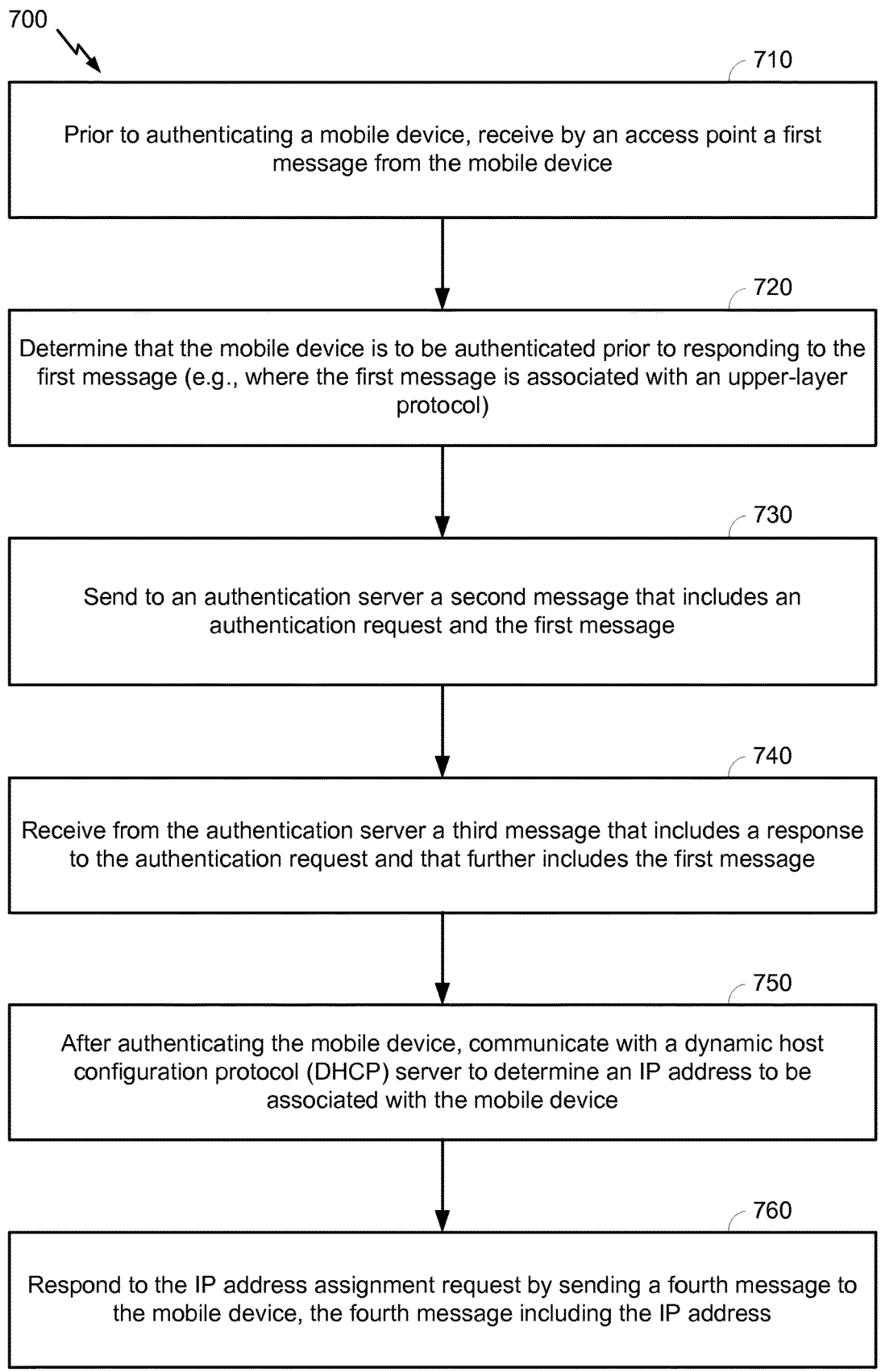
FIG. 7 is a flow chart that illustrates an example method of operation of a device, such as one of the devices of FIG. 1.

FIG. 7 is a flow chart of a method 700 illustrating an example operation of a network device, such as the access point 130 of FIG. 1, the access point 230 of FIG. 2, or a combination thereof. The method 700 includes receiving by an access point, at 710, a first message from a mobile device. The first message may be or may include the request 180 of FIG. 1.

At 720, the access point determines that the mobile device is to be authenticated prior to responding to the first message. For example, if the first message is a request associated with an upper-layer protocol (e.g., a network layer higher than an Internet layer of an Internet Protocol suite of network layers), then authentication should be performed prior to responding to the request. An example of such a request is an Internet Protocol (IP) address assignment request.

At 730, the access point sends to an authentication server a second message that includes an authentication request (e.g., a request to authenticate the mobile device) and the first message. The authentication server may be the authentication server 140 of FIG. 1. In at least one embodiment, the access point sends the second message without storing (e.g., caching or buffering) the first message. The authentication request may include information associated with the mobile device (e.g., credentials, such as a media access control (MAC) address of the mobile device) used by the authentication server to perform an authentication procedure corresponding to the mobile device. In at least one embodiment, the second message sent to the authentication server is encrypted.

At 740, the access point receives from the authentication server a third message. The third message includes a response to the authentication request and further includes the first message. In at least one embodiment, the first message is an IP address assignment request. Accordingly, when the response to the authentication request successfully authenticates the mobile device, the access point may perform an association process in response to the IP address assignment request. For example, the access point may communicate with a dynamic host configuration protocol (DHCP) server to determine an IP address to be associated with the mobile device, at 750. In at least one embodiment, the DHCP server is the second server 150 of FIG. 1. The method 700 may further include responding to the IP address assignment request by sending a fourth message to the mobile device, at 760. The fourth message includes the IP address.

Operation of the access point according to the method 700 may enable the access point to avoid unnecessarily buffering requests that will not be processed until the mobile device is authenticated. For example, by transmitting such requests to the authentication server, the access point need not create a new "state" (e.g., buffer data for) each mobile device making such a request. When the authentication server successfully authenticates the mobile device, the authentication server may return the request with results of the authentication. When the authentication server does not successfully authenticate the mobile device, the authentication server may send to the access point a negative response, which may or may not include the request. Alternatively, in response to unsuccessfully authenticating the mobile device, the authentication server may not respond to the access point, thus avoiding unnecessary buffering of such requests by the access point in cases of unsuccessful authentication.

Figure 8:
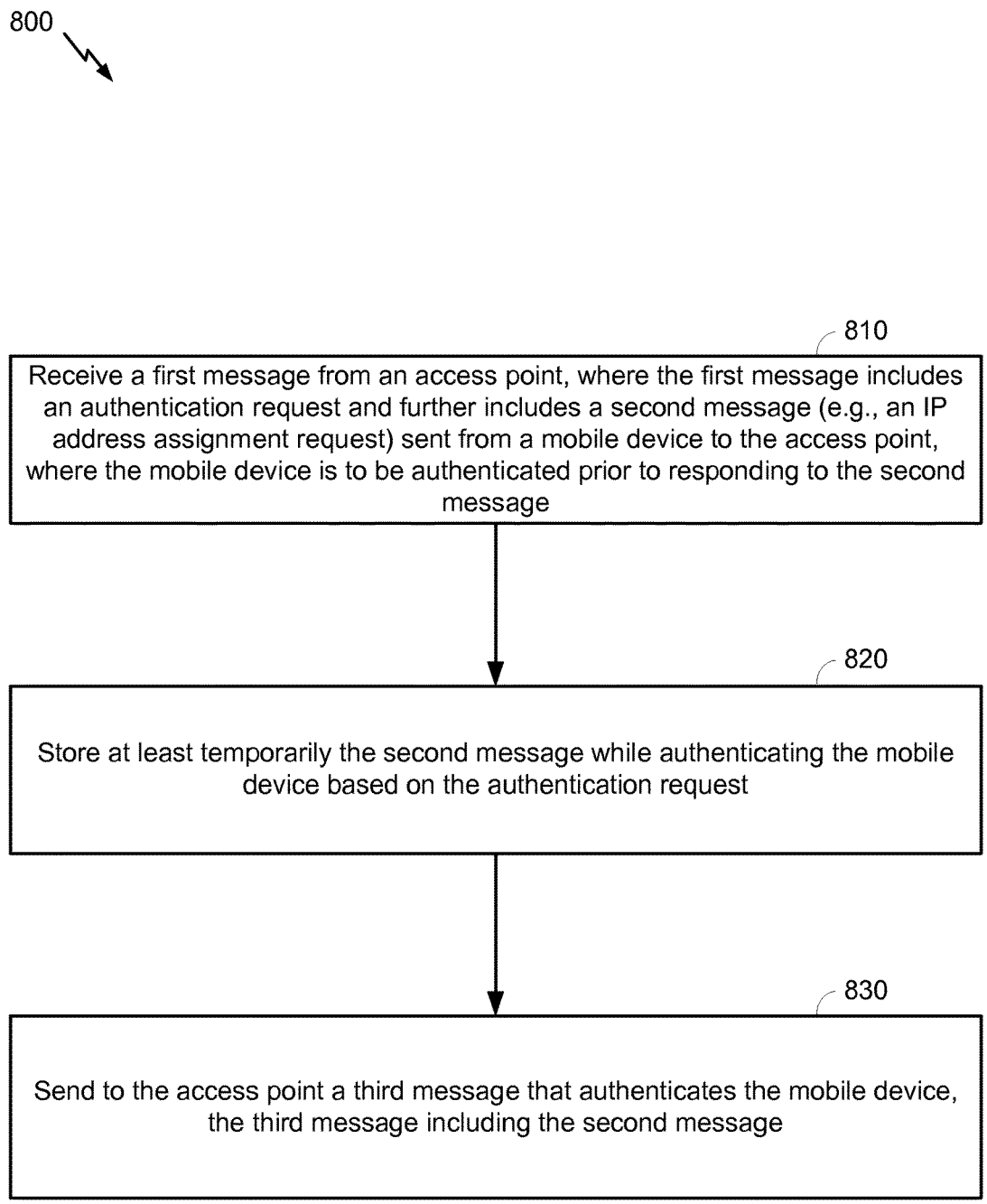
FIG. 8 is a flow chart that illustrates an example method of operation of a device, such as one of the devices of FIG. 1.

FIG. 8 is a flow chart of a method 800 illustrating an example operation of a server, such as the authentication server 140 of FIG. 1. The method 800 includes receiving a first message from an access point, at 810. The first message includes an authentication request and further includes a second message sent from a mobile device to the access point. The second message is associated with an upper-layer protocol (e.g., a layer higher than an Internet layer of an Internet Protocol). An example of such a request is an Internet Protocol (IP) address assignment request. The mobile device may be the mobile device 120 of FIG. 1, the mobile device 220 of FIG. 2, or a combination thereof. The access point may be the access point 130 of FIG. 1, the access point 230 of FIG. 2, or a combination thereof. In at least one embodiment, the first message received by the server is encrypted.

The method 800 further includes storing, at least temporarily, the second message while authenticating the mobile device based on the authentication request, at 820. At 830, the server sends to the access point a third message that authenticates the mobile device. The third message includes the second message, or the second message may be "piggybacked" (e.g., appended) to the third message. According to alternate embodiments, when the server does not successfully authenticate the mobile device, the third message may not include the second message. In other embodiments, when the server does not successfully authenticate the mobile device, the server may not respond to the access point (i.e., may not send the fourth message).

The method 800 of FIG. 8 may avoid unnecessary buffering of messages by the access point. For example, by sending the second message to the server (instead of buffering at the access point) while the mobile device is authenticated, the access point may avoid buffering requests that are not processed (e.g., due to unsuccessful authentication).

Figure 9:
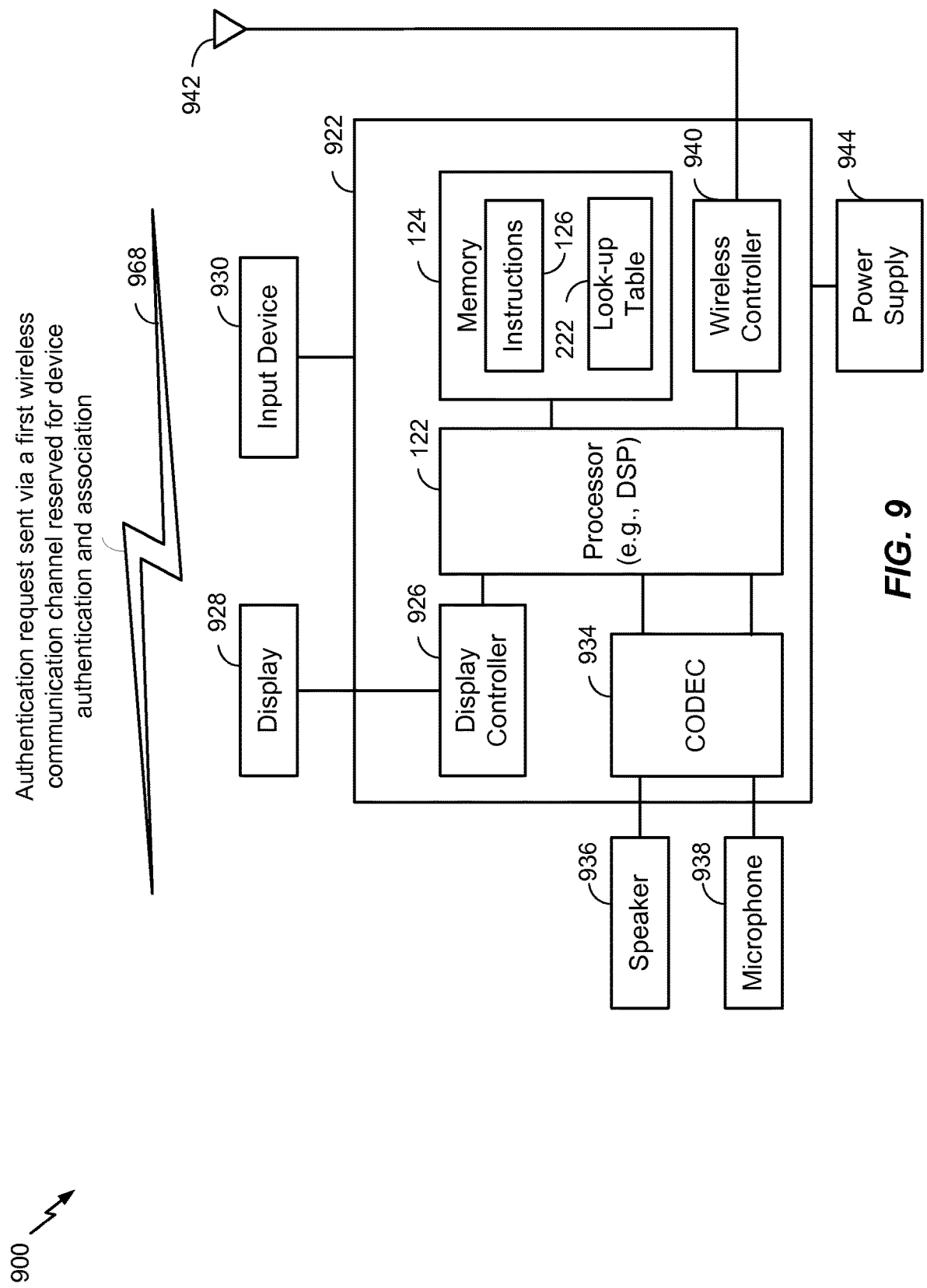
FIG. 9 is a block diagram that illustrates an example embodiment of a device, such one of the devices of FIG. 1.

Referring to FIG. 9, a block diagram of a particular illustrative embodiment of a mobile device is depicted and generally designated 900. The mobile device 900 may be any of the mobile devices described herein, or a combination thereof, such as the mobile device 120 of FIG. 1, the mobile device 220 of FIG. 2, or a combination thereof. For example, the mobile device 900 may include the processor 122 and the memory 124 of FIG. 1. The memory 124 may store the instructions 126 of FIG. 1 and the look-up table 222 of FIG. 2. The processor 122 may correspond to a digital signal processor (DSP). The instructions 126 may be executable by the processor 122 to perform operations, methods, and processes described herein. For example, the instructions 126 may be executable by the processor 122 to send an authentication request 968 via a first wireless communication channel (e.g., one of the at least one wireless communication channels 240 of FIG. 2) reserved for device authentication and association. The authentication request 968 may correspond to the authentication request 160 of FIG. 1.

FIG. 9 also shows a display controller 926 that is coupled to the processor 122 and to a display 928. A coder/decoder (CODEC) 934 can also be coupled to the processor 122. A speaker 936 and a microphone 938 can be coupled to the CODEC 934.

FIG. 9 also indicates that a wireless controller 940 can be coupled to the processor 122 and to an antenna 942. The wireless controller 940 and the antenna 942 can be utilized by the processor to perform one or more operations and methods described herein. For example, the processor 122 may execute the instructions 126 to cause the wireless controller 940 and the antenna 942 to send the authentication request 968, to perform one or more other operations and methods described herein, or a combination thereof.

In a particular embodiment, the processor 122, the display controller 926, the memory 124, the CODEC 934, and the wireless controller 940 are included in a system-in-package or system-on-chip device 922. In a particular embodiment, an input device 930 and a power supply 944 are coupled to the system-on-chip device 922. Moreover, in a particular embodiment, and as illustrated in FIG. 9, the display 928, the input device 930, the speaker 936, the microphone 938, the antenna 942, and the power supply 944 are external to the system-on-chip device 922. However, each of the display 928, the input device 930, the speaker 936, the microphone 938, the antenna 942, and the power supply 944 can be coupled to a component of the system-on-chip device 922, such as to an interface or to a controller.

In a particular embodiment, a non-transitory computer-readable medium (e.g., the memory 124) stores instructions (e.g., the instructions 126) that are executable by a processor (e.g., the processor 122) to cause the processor to scan for a first wireless communication channel (e.g., the at least one wireless communication channel 240 of FIG. 2) that is reserved for device authentication and association. The instructions are further executable by the processor to send an authentication request (e.g., the authentication request 968) to an access point (e.g., the access point 130 of FIG. 1, the access point 230 of FIG. 2, or a combination thereof) via the first wireless communication channel and to receive a reply to the authentication request from the access point.

In a particular embodiment, a non-transitory computer-readable medium (e.g., the memory 124) stores instructions (e.g., the instructions 126) that are executable by a processor (e.g., the processor 122) to cause the processor to receive a beacon (e.g., the beacon 170 of FIG. 1) sent from an access point (e.g., the access point 130 of FIG. 1, the access point 230 of FIG. 2, or a combination thereof). The beacon includes a duration parameter associated with a duration of a time interval for device authentication and association. The instructions are further executable by the processor to cause the processor to perform a hash operation on a value that is selected by the mobile device 900 or that is associated with the mobile device 900. Performing the hash operation on the value generates a back-off time interval. The instructions are further executable by the processor to cause the processor to send to the access point, during the time interval for device authentication, an authentication request (e.g., the authentication request 160 of FIG. 1), an association request (e.g., the request 180 of FIG. 1), or a combination thereof, at a time determined according to a start time of the time interval plus the back-off time interval.

In a particular embodiment, a non-transitory computer-readable medium (e.g., the memory 134) stores instructions (e.g., the instructions 136) that are executable by a processor (e.g., the processor 132) to determine a load associated with a wireless local area network (WLAN), an expected load associated with the WLAN, or a combination thereof. In at least one embodiment, the WLAN is the wireless network 110 of FIG. 1. The instructions are further executable by the processor to cause the processor to determine based on the load or the expected load a duration parameter associated with a duration of a time interval for device authentication. The instructions are further executable by the processor to cause the processor to send at a beacon transmit time a beacon (e.g., the beacon 170 of FIG. 1) that includes the duration parameter and to receive an authentication request (e.g., the authentication request 160 of FIG. 1) from a mobile device (e.g., the mobile device 120 of FIG. 1, the mobile device 220 of FIG. 2, or a combination thereof) during the time interval for device authentication.

In a particular embodiment, a non-transitory computer-readable medium (e.g., the memory 134) stores instructions (e.g., the instructions 136) that are executable by a processor (e.g., the processor 132) to receive an authentication request (e.g., the authentication request 160 of FIG. 1) from a mobile device (e.g., the mobile device 120 of FIG. 1, the mobile device 220 of FIG. 2, or a combination thereof). The authentication request is received via a first wireless communication channel (e.g., the at least one wireless communication channel 240 of FIG. 2) that is reserved for device authentication and association. The instructions are further executable by the processor to communicate with an authentication server (e.g., the authentication server 140 of FIG. 1) to authenticate the mobile device and to send a reply to the authentication request to the mobile device via the first wireless communication channel.

In a particular embodiment, a non-transitory computer-readable medium (e.g., the memory 134) stores instructions (e.g., the instructions 136) that are executable by a processor (e.g., the processor 132) to receive a first message (e.g., the request 180 of FIG. 1) from a mobile device (e.g., the mobile device 120 of FIG. 1, the mobile device 220 of FIG. 2, or a combination thereof). The mobile device is to be authenticated prior to responding to the first message. The instructions are further executable by the processor to send to an authentication server (e.g., the authentication server 140 of FIG. 1) a second message that includes an authentication request and the first message and to receive from the authentication server a third message. The third message includes a response to the authentication request and the first message.

In a particular embodiment, a non-transitory computer-readable medium (e.g., the memory 144) includes instructions (e.g., the instructions 146) that are executable by a processor (e.g., the processor 142) to receive a first message from an access point (e.g., the access point 130 of FIG. 1, the access point 230 of FIG. 2, or a combination thereof). The message includes an authentication request and further includes a second message (e.g., the request 180 of FIG. 1) sent from a mobile device (e.g., the mobile device 120 of FIG. 1, the mobile device 220 of FIG. 2, or a combination thereof) to the access point. The mobile device is to be authenticated prior to responding to the second message. The instructions are further executable by the processor of the server to store at least temporarily the second message in the memory of the server while authenticating the mobile device based on the authentication request and to send to the access point a third message that authenticates the mobile device. The third message includes the second message.

In a particular embodiment, a mobile device (e.g., the mobile device 120, the mobile device 900, or a combination thereof) includes means for storing (e.g., the memory 124) instructions (e.g., the instructions 126) and means for executing (e.g., the processor 122) the instructions to receive a beacon sent from an access point. The beacon includes a duration parameter associated with a duration of a time interval for device authentication and association. The instructions are further executable by the means for executing the instructions to perform a hash operation on a value that is selected by the mobile device or that is associated with the mobile device. Performing the hash operation on the value generates a back-off time interval. The instructions are further executable by the means for executing the instructions to send, during the time interval for device authentication, an authentication request to the access point an authentication request at a time determined according to a start time of the time interval plus the back-off time interval.

In a particular embodiment, a network device (e.g., the access point 130, the access point 230, or a combination thereof) includes means for storing (e.g., the memory 134) instructions (e.g., the instructions 136) and means for executing (e.g., the processor 132) the instructions to determine a load associated with a wireless local area network (WLAN), an expected load associated with the WLAN, or a combination thereof. The instructions are further executable by the means for executing the instructions to determine, based on the load or the expected load, a duration parameter associated with a duration of a time interval for device authentication. The instructions are further executable by the means for executing the instructions to send, at a beacon transmit time, a beacon that includes the duration parameter and to receive an authentication request from a mobile device during the time interval for device authentication.

In a particular embodiment, a mobile device (e.g., the mobile device 120, the mobile device 900, or a combination thereof) includes means for storing (e.g., the memory 124) instructions (e.g., the instructions 126) and means for executing (e.g., the processor 122) the instructions to scan for a first wireless communication channel that is reserved for device authentication and association. The instructions are further executable by the means for executing the instructions to send an authentication request to an access point via the first wireless communication channel and to receive a reply to the authentication request from the access point.

In a particular embodiment, a network device (e.g., the access point 130, the access point 230, or a combination thereof) includes means for storing (e.g., the memory 134) instructions (e.g., the instructions 136) and means for executing (e.g., the processor 132) the instructions to receive an authentication request from a mobile device. The authentication request is received via a first wireless communication channel that is reserved for device authentication and association. The instructions are further executable by the means for executing the instructions to communicate with an authentication server to authenticate the mobile device and to send a reply to the authentication request to the mobile device via the first wireless communication channel.

In a particular embodiment, a network device (e.g., the access point 130, the access point 230, or a combination thereof) includes means for storing (e.g., the memory 134) instructions (e.g., the instructions 136) and means for executing (e.g., the processor 132) the instructions to receive, prior to authenticating a mobile device, a first message from the mobile device. The mobile device is to be authenticated prior to responding to the first message. The instructions are further executable by the means for executing the instructions to send to an authentication server a second message that includes an authentication request and the first message and to receive from the authentication server a third message that includes a response to the authentication request and the first message.

In a particular embodiment, a server (e.g., the authentication server 140) includes means for storing (e.g., the memory 144) instructions (e.g., the instructions 146) and means for executing (e.g., the processor 142) the instructions to receive a first message from an access point. The first message includes an authentication request and further includes a second message sent from a mobile device to the access point. The mobile device is to be authenticated prior to responding to the second message. The instructions are further executable by the means for executing the instructions to store, at least temporarily, the second message while authenticating the mobile device based on the authentication request and to send to the access point a third message that authenticates the mobile device, the third message including the second message.

Those of skill would further appreciate that the various illustrative logical blocks, configurations, modules, circuits, and method steps described in connection with the embodiments disclosed herein may be implemented as electronic hardware, instructions stored on a tangible computer-readable medium and to be executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of various methods or processes described in connection with the embodiments disclosed herein may be embodied directly in hardware, in instructions executed by a processor, or in a combination of the two. Instructions to be executed by a processor may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   prior to authenticating a mobile device, receiving by an access point a first message from the mobile device, wherein the mobile device is to be authenticated prior to processing the first message;
   authenticating the mobile device, wherein the authenticating comprises:
      sending to an authentication server a second message that includes an authentication request and the first message; and
      receiving from the authentication server a third message that includes the first message and an indication that the authentication of the mobile device is successful; and
   processing the first message received from the authentication server by the access point based on whether the authentication of the mobile device is successful, wherein the first message includes an Internet Protocol (IP) address assignment request, and wherein processing the first message comprises:
      communicating with a dynamic host configuration protocol (DHCP) server to determine an IP address to be associated with the mobile device; and
      sending a fourth message to the mobile device, the fourth message including the IP address to be associated with the mobile device.

2. The method of claim 1, wherein the first message is associated with an upper-layer protocol associated with a network layer higher than an Internet layer of an Internet Protocol.

3. The method of claim 1, wherein the access point does not maintain the first message during a time interval between sending the second message and receiving the third message.

4. The method of claim 1, wherein the second message is encrypted.

5. The method of claim 1, further comprising receiving from the mobile device the authentication request via a first wireless communication channel that is reserved for device authentication and association.

6. A network device comprising:
   a processor; and
   a memory storing instructions, wherein the instructions are executable by the processor to cause the processor to:
      prior to authenticating a mobile device, receive a first message from the mobile device, wherein the mobile device is to be authenticated prior to responding to the first message;
      authenticate the mobile device, wherein to authenticate the mobile device, the memory includes instructions executable by the processor to cause the processor to:
         send to an authentication server a second message that includes an authentication request and the first message; and
         receive from the authentication server a third message that includes the first message and an indication that the authentication of the mobile device is successful; and
      process the first message received from the authentication server based on whether the authentication of the mobile device is successful, wherein the first message includes an Internet Protocol (IP) address assignment request, and wherein to process the first message, the memory includes instructions executable by the processor to cause the processor to:
         communicate with a dynamic host configuration protocol (DHCP) server to determine an IP address to be associated with the mobile device; and
         send a fourth message to the mobile device, the fourth message including the IP address to be associated with the mobile device.

7. A non-transitory computer-readable medium storing instructions that are executable by a processor to cause the processor to:
   prior to authenticating a mobile device, receive a first message from the mobile device, wherein the mobile device is to be authenticated prior to responding to the first message;
   authenticate the mobile device, wherein to authenticate the mobile device, the instructions further cause the processor to:
      send to an authentication server a second message that includes an authentication request and the first message; and
      receive from the authentication server a third message that includes a response to the authentication request and the first message; and
   process the first message received from the authentication server based on whether the authentication of the mobile device is successful, wherein the first message includes an Internet Protocol (IP) address assignment request, and wherein to process the first message, the instructions further cause the processor to:
      communicate with a dynamic host configuration protocol (DHCP) server to determine an IP address to be associated with the mobile device; and
      send a fourth message to the mobile device, the fourth message including the IP address to be associated with the mobile device.

8. A network device comprising:
   means for storing instructions; and
   means for executing the instructions to:
      prior to authenticating a mobile device, receive a first message from the mobile device, wherein the mobile device is to be authenticated prior to responding to the first message;
      authenticate the mobile device, wherein to authenticate the mobile device, the means for executing the instructions is further configured to:
         send to an authentication server a second message that includes an authentication request and the first message; and
         receive from the authentication server a third message that includes a response to the authentication request and the first message; and
      process the first message received from the authentication server based on whether the authentication of the mobile device is successful, wherein the first message includes an Internet Protocol (IP) address assignment request, and wherein to process the first message, the means for executing the instructions is further configured to:

communicate with a dynamic host configuration protocol (DHCP) server to determine an IP address to be associated with the mobile device; and send a fourth message to the mobile device, the fourth message including the IP address to be associated with the mobile device.

\* \* \* \* \*